March 30, 1926.  1,579,149

F. R. RUBELLI ET AL

COUPLING

Filed April 11, 1924

Francis R. Rubelli.
Oskar Frisk.
INVENTOR

BY Victor J. Evans.
ATTORNEY

Patented Mar. 30, 1926.

1,579,149

UNITED STATES PATENT OFFICE.

FRANCIS R. RUBELLI, OF WEST NEW BRIGHTON, AND OSKAR FRISK, OF BROOKLYN, NEW YORK.

COUPLING.

Application filed April 11, 1924. Serial No. 705,871.

*To all whom it may concern:*

Be it known that we, FRANCIS R. RUBELLI and OSKAR FRISK, citizens of the United States and Sweden, respectively, residing at West New Brighton and Brooklyn, respectively, in the counties of Richmond and Kings, respectively, and State of New York, have invented new and useful Improvements in Couplings, of which the following is a specification.

This invention relates to couplings for use in connecting the meeting ends of pipe lines.

The principal object of the invention is the provision of a coupling which may be quickly connected or disconnected in a pipe line such as that used in unloading oil from ships and wherein the coupling is so constructed as to be leak proof.

Another object of the invention is to provide a coupling including a male and female member adapted to be brought into co-acting engagement with each other and a means for locking the members in co-acting engagement.

A still further object of the invention is to provide a simple, quick and efficient coupling for use in pipe lines, irrespective of whether the pipe line is flexible such as a hose or rigid such as a pipe.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 5:
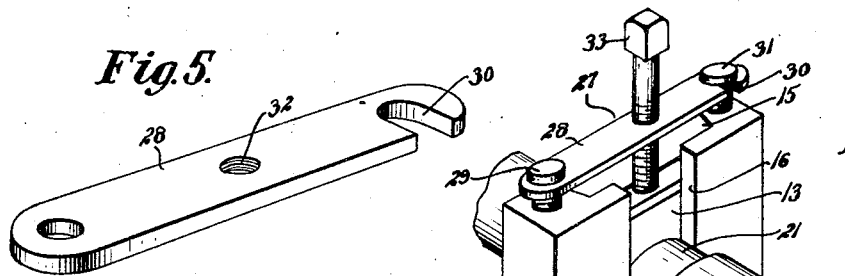
Figure 5 is a detail perpective view of the locking plate.
Figure 1:
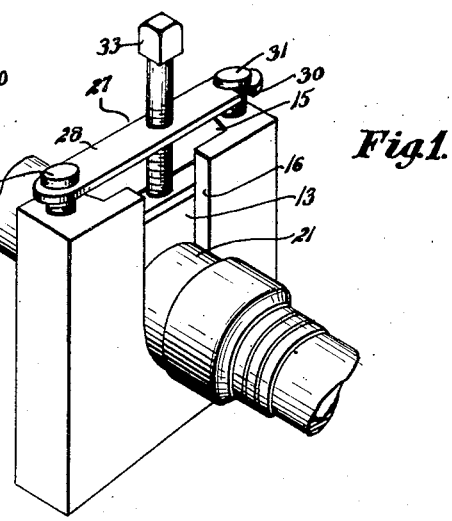
Figure 1 is a perspective view of our invention showing the same in use.
Figure 2:
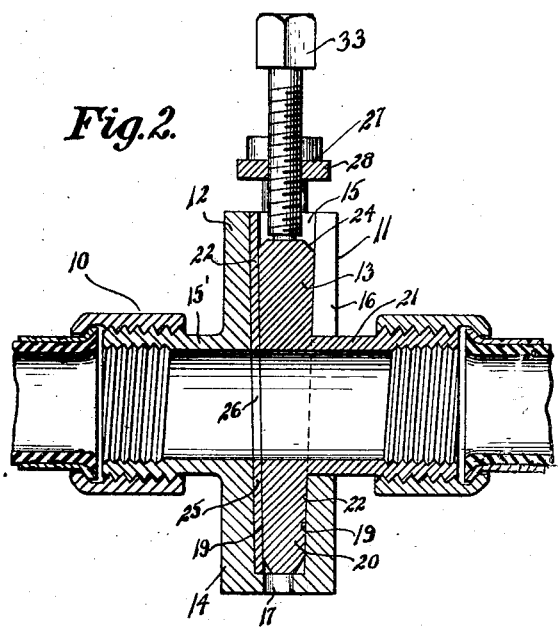
Figure 2 is a vertical longitudinal sectional view of the same.
Figure 4:
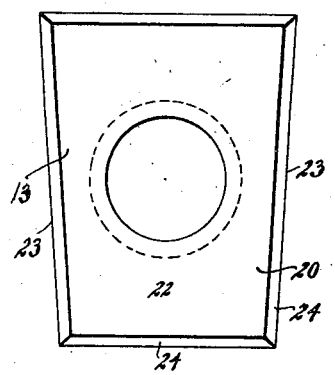
Figure 4 is a detail elevation view of the male member.
Figure 3:
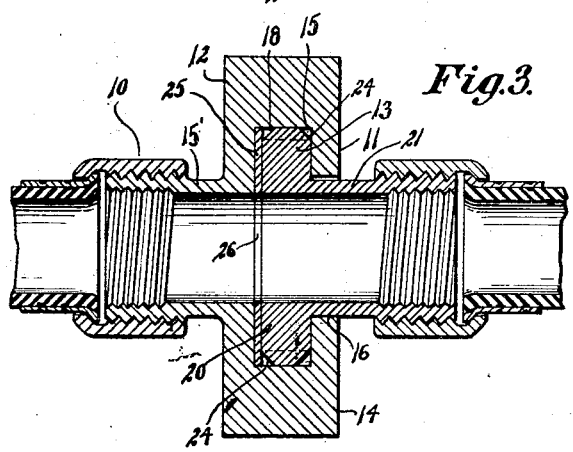
Figure 3 is a horizontal sectional view thereof.

Referring more particularly to the drawing, the reference numeral 10 designates the meeting ends of a pipe line to which our coupling shown in its entirety as at 11, is connected. The coupling includes a female member 12 and a male member 13, which members are adapted to be brought into co-acting engagement with each other and locked therein in a manner to be presently described.

The female member 12 comprises a housing 14 having a recess 15 therein. Projecting from the rear wall of the housing is a tubular extension 15' which may be either internally screw threaded or externally screw threaded for receiving one of the ends 10 for connecting the same with the female member. The front wall of the housing is cut away to form a slot 16 to receive the extension on the male member to be presently described. The bottom wall of the recess 15 is provided with an opening 17 to permit the escape of any liquid which may be accumulated therein when the male or female members are disconnected, and to designate that a leak exists when the male and female members are connected. The side walls of the recess are tapered from the top to the bottom as at 18 and the front and rear wall are likewise tapered as at 19.

The male member 13 comprises a head 20 formed with an extension 21 which may be threaded in a manner similar to the extension 15 on the female member or may be provide with an external groove for co-action with a clamping ring when connecting a hose thereto. The front and rear faces of the head are tapered as at 22 for co-action with the tapered walls 19 of the female member, and the sides of the head are tapered as at 23 for co-action with the tapered side walls of the female member. The edges of the head may be beveled as at 24 for preventing chipping of the same when bringing the two members into co-acting engagement. A gasket 25 is interposed between the rear wall of the female member and the front face of the head and is provided with an opening 26 for registration with the bore in the extensions 15 and 21.

A locking means is shown as at 27 for preventing accidental removal of the members and is adapted to hold the members in co-acting engagement with each other. The locking means comprises a plate 28, pivoted to the top of the female member 12 at one side thereof by a set screw 29. The free end of the plate is formed with a slot 30 for co-action with the set screw 31 entering the other side of the female member. The plate is formed centrally thereof with a threaded opening 32 for receiving a clamping screw 33 which bears against the top of the head of the male member to hold the same seated with the female member. When the clamping screw has been screwed down upon the head of the male member, the heads of the set screw limit the upward movement of the plate, at which time the plate serves as a rigid bearing for the clamping screw. When it is desired to remove the male member from the female member, the clamping screw is turned in the reverse direction and the plate 21 swung about its pivot to uncover the top of the recess in the female member.

From the foregoing description, the manner of assembling the coupling is clearly set forth and it will be readily appreciated that the same is highly efficient for the purpose intended.

What is claimed as new is:—

A pipe coupling comprising a female member having a recess provided therein, an attaching nipple extending from one wall of said member, the opposite wall of said member having a slot therein terminating short of the bottom wall thereof, all of the vertical interior walls of said recess being tapered from top to bottom, a male member including a head, all of the vertical walls of said head being correspondingly tapered for seating engagement with the vertical walls of said recess, an attaching nipple extending from said head and through the slot in said female member, a gasket interposed between one wall of said recess and the adjacent co-acting face of said head, said female member having a drain opening therein communicating with said recess, and an adjustable clamping means carried by said female member and engaging said male member for holding the latter seated with the former.

In testimony whereof we have affixed our signatures.

FRANCIS R. RUBELLI.
OSKAR FRISK.